United States Patent
Wolpert

[11] Patent Number: 6,082,219
[45] Date of Patent: Jul. 4, 2000

[54] PEDAL ARRANGEMENT IN A FOOT SPACE OF A MOTOR VEHICLE

[75] Inventor: Engelbert Wolpert, Stuttgart, Germany

[73] Assignee: DaimlerChrysler AG, Stuttgart, Germany

[21] Appl. No.: 09/026,523

[22] Filed: Feb. 20, 1998

[30] Foreign Application Priority Data

Feb. 20, 1997 [DE] Germany .................... 197 06 692

[51] Int. Cl.[7] .................. G05G 1/14; B60K 28/10
[52] U.S. Cl. ................. 74/512; 74/560; 180/274
[58] Field of Search .................. 74/512, 513, 560, 74/478; 180/274, 275

[56] References Cited

U.S. PATENT DOCUMENTS

| | | | |
|---|---|---|---|
| 3,691,863 | 9/1972 | Shaffer | 74/478 |
| 5,771,752 | 6/1998 | Cicotte | 74/512 |
| 5,823,064 | 10/1998 | Cicotte | 74/513 X |
| 5,848,558 | 12/1998 | Isono et al. | 74/512 |
| 5,855,143 | 1/1999 | Ewing | 74/512 |

FOREIGN PATENT DOCUMENTS

| | | | |
|---|---|---|---|
| 4409285 A1 | 10/1994 | Germany | 74/512 |
| 195 15 852 | 11/1995 | Germany . | |
| 195 01 859 | 7/1996 | Germany . | |
| 5-185912 | 7/1993 | Japan | 74/512 |

*Primary Examiner*—Vinh T. Luong
*Attorney, Agent, or Firm*—Evenson, McKeown, Edwards & Lenahan, P.L.L.C.

[57] ABSTRACT

An improved pedal arrangement is provided in a foot space of a motor vehicle. Under a load applied during a frontal impact, it is known to uncouple a brake pedal from a brake operating unit when the brake pedal is fixedly disposed in the interior of a vehicle body. At least one pedal in the improved pedal arrangement has a lever extension which projects beyond a swivelling shaft. A dimensionally stable transmitting rod, which is aligned with the longitudinal direction of the vehicle, is linked to the lever extension in a force-transmitting manner. The transmitting rod is operatively connected by various elements with a vehicle operating unit.

10 Claims, 1 Drawing Sheet

PEDAL ARRANGEMENT IN A FOOT SPACE OF A MOTOR VEHICLE

This application claims the priority of German patent application No. 19706692.5-21, filed Feb. 20, 1997.

BACKGROUND AND SUMMARY OF THE INVENTION

This invention relates to a pedal arrangement in a foot space of a motor vehicle having at least one pedal. The pedal swivels about a swivelling axis and is disposed on a bearing block. The bearing block for the pedal is fixed to a vehicle body element suitably arranged in a vehicle interior.

German patent document DE 195 01 859 A1 describes a pedal arrangement in a motor vehicle in which the pedal is disposed so that it swivels on a bearing block and has a lever extension which projects beyond the swivelling axis. A dimensionally stable transmitting rod, which is aligned with the longitudinal direction of the vehicle, is linked to the pedal in a force-transmitting manner. The transmitting rod is in operative connection with a brake operating unit. During an accident, the transmitting rod has a swivelling effect on the lever extension or on the pedal only when the brake operating unit is displaced in the direction of the foot space. Because of its arrangement in the engine compartment, the brake operating unit may not be acted upon by force and displaced. An intrusion of the front wall, however, may take place anyway. In this situation, the pedal would, as a result, not be pulled out of the impact area of the driver's legs.

Another pedal arrangement is known from German patent document DE 195 15 852 A1. In a foot space of a vehicle interior of a motor vehicle, a pedal arrangement, equipped with a brake pedal, is provided. The brake pedal is swivellably disposed on a bearing block which, in the vehicle interior, is fixed to a vehicle body element. A plunger rod, which projects to the front in the longitudinal direction of the vehicle, connects the brake pedal with a brake operating unit which has a brake cylinder and a brake booster. The plunger rod projects through a front-side front wall of the vehicle body. On a side of the front wall facing away from the vehicle interior, the brake booster is fixed to the front wall. A desired breaking point is provided to the plunger rod in order to avoid injuries to the feet caused by the brake pedal in the foot space during an accident which results in front wall intrusions. The desired breaking point permits a separation of the brake pedal from the brake operating unit, that is, an uncoupling of the brake pedal. As a result, the brake pedal can be swivelled, without resistance, toward the front wall so that it does not project into the foot space.

It is a primary object of the invention to improve a pedal arrangement of the above-mentioned type such that the danger of injury to the driver in the foot space can be further reduced.

This primary object is achieved by a particular pedal arrangement in a foot space of a motor vehicle including at least one pedal, a bearing block on which the pedal is disposed so as to swivel about a swivelling axis, and a vehicle body element, to which the bearing block for the pedal is fixed, arranged in an area of a vehicle interior. A lever extension on the pedal projects beyond the swivelling axis to an opposite side, and a dimensionally stable transmitting rod, which extends in a longitudinal direction of the vehicle, is linked at one end in a force-transmitting manner to the lever extension. The dimensionally stable transmitting rod is in an operative connection with a vehicle operating unit such as a brake booster. A lever arm of a double-armed lever rocker, which is swivellably disposed on a front wall, is linked to another end of the dimensionally stable transmitting rod of the vehicle body. An opposite lever arm of the lever rocker is linked to a plunger rod of the vehicle operating unit which extends in the longitudinal direction of the vehicle and substantially parallel to the transmitting rod in the direction of the front wall.

The at least one pedal has a lever arm or extension which projects beyond the swivelling axis. A dimensionally stable transmitting rod is aligned with and extends in the longitudinal direction of the vehicle. The transmitting rod is linked to the lever extension in a force-transmitting manner and is operatively connected by various elements with a vehicle operating unit such as a brake operating unit. The operative connection between the transmitting rod and the vehicle operating unit may include direct connections as well as indirect connections by additional transmitting members to the vehicle operating unit. When the vehicle operating unit is in the form of a brake operating unit, it has a brake cylinder and a brake booster. However, the vehicle or brake operating unit can also include a brake cylinder without an additional brake booster. The vehicle operating unit can further be formed by an operating element such as a clutch or a carburetor. The linking of the pedal according to the invention ensures that strong frontal impact loads, which result in front wall intrusions, cause a swivelling of the pedal toward the front wall, and thus away from the foot space, at the front of the vehicle. The transmitting rod is moved rearward in the longitudinal direction of the vehicle and, as a result, into the vehicle interior. A reverse movement of the pedal is achieved by the lever extension.

According to one feature of the invention, a transverse support is provided as a vehicle body element which extends in the area of a center console. A transverse center console support extending above the foot space in the vehicle interior is particularly suitable for the connection of the bearing block and thus of the swivel bearing of the pedal. The reason for this is that the transverse center console support is disposed sufficiently far into the vehicle interior that it is normally not displaced during strong frontal impact loads. Rather, this support maintains its position relative to the vehicle interior.

In one particular embodiment of the invention, the transmitting rod is linked to a lever arm of a double-armed lever rocker which is swivellably disposed on a front wall of the vehicle body. In this embodiment, an opposite lever arm of the lever rocker is linked to a plunger rod of the brake operating unit which extends in the longitudinal direction of the vehicle parallel to the transmitting rod in the direction of the front wall. This embodiment is advantageous when the brake operating unit is situated at approximately the same level as the brake pedal. The lever rocker, therefore, adjusts the positioning of the transmitting rod relative to the brake operating unit and thus relative to the plunger rod.

According to a further feature of the invention, the lever rocker is disposed for swivel movement by a bearing block which is fixed to the front wall. The bearing block and the plunger rod are dimensioned such that the lever rocker is aligned parallel to the front wall. When an intrusion of the front wall because of a frontal impact load occurs, an essentially parallel displacement of the lever rocker takes place in the direction of the vehicle interior. The desired swivelling of the pedal to the front toward the front wall is simultaneously achieved.

According to a further feature of the invention, the bearing block for the lever rocker and the plunger rod are designed such that, during a frontal impact load, the bearing block and the plunger rod act like rigid components. This ensures that, during a frontal impact load, the transmitting rod is moved, independently of the position of the lever rocker, into the vehicle interior. As a result, the pedal carries out the desired forward swivel movement toward the front wall.

BRIEF DESCRIPTION OF THE DRAWINGS

Additional advantages and characteristics of the invention are apparent from the following description of a preferred embodiment of the invention which is illustrated by the drawing figures.

DESCRIPTION OF THE PREFERRED EMBODIMENT

Figure 1:
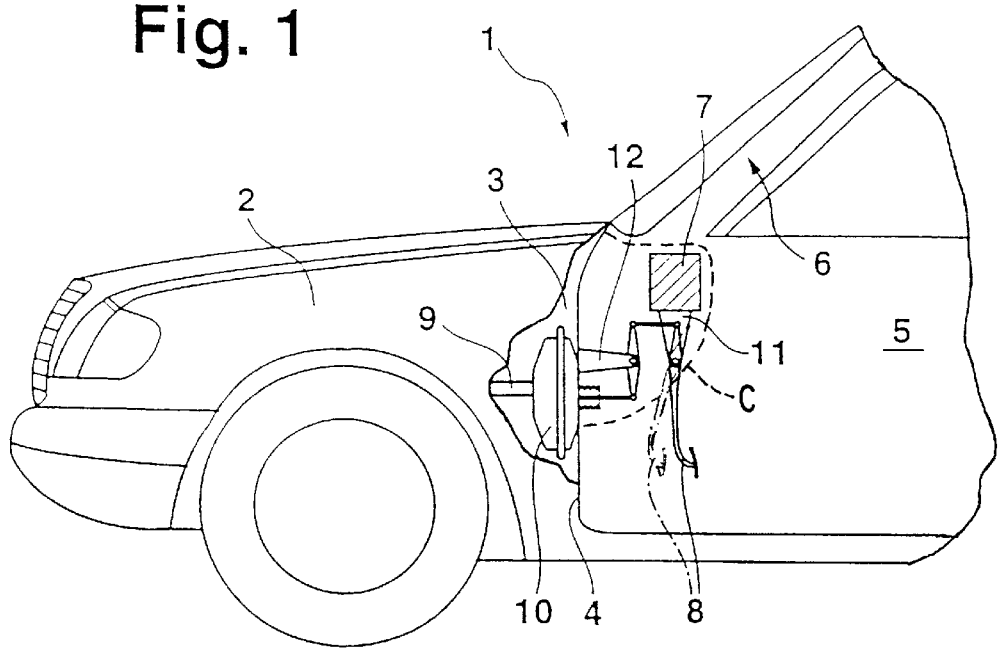
FIG. 1 is a schematic view of a passenger car with an embodiment of a pedal arrangement according to the invention in a frontal area of a vehicle interior.

A passenger car 1 according to FIG. 1 has a frontal area 2 which encloses an engine compartment 3. On its rearward side in the longitudinal direction of the vehicle, the engine compartment 3 is separated from a vehicle interior 5 by a front wall 4. The front wall 4 is part of a vehicle body support structure and thus part of a vehicle body. In a manner not shown in detail, a center console C is arranged in the vehicle interior 5, adjoins the front wall 4 and is arranged below a vehicle body element formed by a windshield 6. The center console is supported by a transverse center console support 7 which extends through the whole vehicle interior 5, is connected in the steering area to a transverse windshield support extending below the windshield, and is connected laterally to A-columns of the vehicle body support structure. The transverse center console support 7 is also part of the vehicle body support structure and therefore part of the vehicle body.

Figure 2:
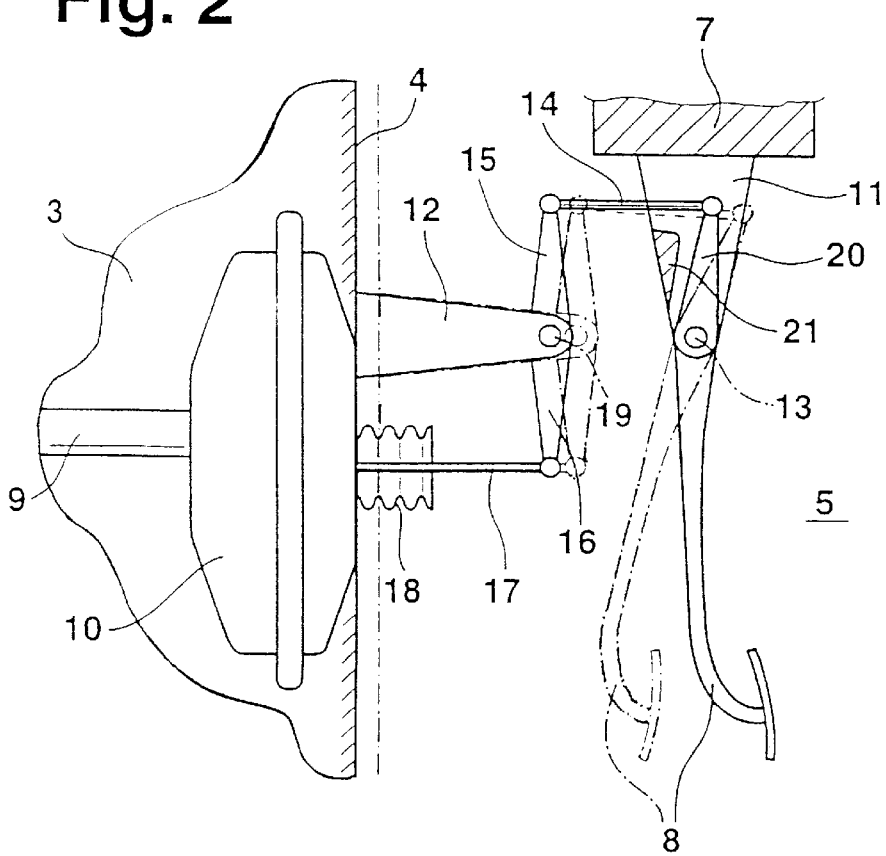
FIG. 2 is an enlarged view of the pedal arrangement according to FIG. 1.

Below the center console, a foot space is formed in the vehicle interior 5 and adjoins the front wall on a driver side. A pedal arrangement is provided in the foot space. In addition to a gas pedal, which is not shown, and, optionally, a clutch pedal, which is also not shown, the pedal arrangement has a brake pedal 8 which can swivel about a swivelling axis 13 (FIG. 2) disposed on a first bearing block 11. The bearing block 11 is fixed on an underside of the transverse center console support 7 by welding or releasable fastening devices. The brake pedal 8 projects downward from the swivelling axis 13 and also from the bearing block 11. The brake pedal 8 also has a lever extension 20 which is molded on in one piece and extends upwards to the opposite side from the swivelling axis 13. On the free end of the lever extension 20, a linking point is provided for a transmitting rod 14. A stop 21 is designed to contact the lever extension 20, is fixed to the bearing block 11 and prevents swivelling of the lever extension 20 beyond a certain point in the longitudinal direction of the vehicle toward the front wall 4. The transmitting rod 14 projects forward from the lever extension 20, in the longitudinal direction of the vehicle, toward the front wall 4. The transmitting rod is linked, by its opposite front end, to an upper lever arm 15 of a double-armed lever rocker 15, 16. In the illustrated embodiment, the upwardly continued lever extension 20 of the brake pedal 8 projects, in its operating position, approximately vertically upwards. The transmitting rod 14 is oriented approximately horizontally and extends to the front of the vehicle. The lever arm 15 of the lever rocker 15, 16 projects from its front-side linking point, to which the transmitting rod 14 is linked, approximately vertically downward. The lever rocker 15, 16 can swivel about a swivelling axis 19 on a second bearing block 12. The swivelling axis 19 is parallel to the swivelling axis 13 of the brake pedal 8. A lower lever arm 16 of the lever rocker 15, 16 projects so as to form a straight-line extension of the upper lever arm 15 and extends away from the swivelling axis approximately vertically downward. The lower lever arm 16 has the same length as the lever arm 15. On its lower end, the lever arm 16 has a linking point located at a distance from the swivelling axis 19 which corresponds to the distance from the linking point of the upper lever arm 15 to the swivelling axis 19. A plunger rod 17 is linked to the linking point of the lower lever arm 16 and projects horizontally in the longitudinal direction of the vehicle. The plunger rod 17 projects through the front wall 4 into a vehicle operating unit formed by a brake booster 10 which, on the side of the front wall 4 facing the engine compartment 3, is fixed to this front wall 4. A bellows 18 surrounds the portion of the plunger rod 17 penetrating through the front wall 4. A brake cylinder 9 is connected to the brake booster 10 in a manner known per se.

The lever rocker 15, 16 can swivel about its swivelling axis 19. The axis 19 is disposed in a desired location by a bearing block 12 which is fixed to the front wall 4. The bearing block 12 projects from the front wall 4 approximately horizontally into the vehicle interior 5.

In a normal braking operation, the brake pedal 8 acts, by way of a "lever chain" formed by the lever extension 20, the transmitting rod 14, the lever rocker 15, 16 and the plunger rod 17, on the brake operating unit. The brake operating unit is formed by a brake booster 10 and a brake cylinder 9. If the passenger car 1 experiences a frontal impact and, because of the front impact load, the brake operating unit, together with the front wall 4, is displaced into the vehicle interior, then the lever rocker 15, 16 is necessarily displaced according to the representation shown by the broken line into the vehicle interior 5. As a result, an axial displacement of the transmitting rod 14 (broken line representation) also takes place. This axial displacement leads to a swivel movement of the brake pedal 8 because the transverse center console support 7 itself at least essentially maintains its position in the vehicle interior 5. The transverse center console support 7, therefore, is uncoupled from and unaffected by the intrusive movements of the front wall 4. Because of the bearing block 11, therefore, the support 7 forms a stationary swivelling point for the brake pedal 8. As the brake pedal 8 swivels, according to the representation by the broken line, the lower end of the brake pedal 8 is swivelled toward the front wall 4. The clearance in the foot space of the vehicle interior 5 is enlarged. As a result, the likelihood of injuries to the feet of a driver is reduced.

The foregoing disclosure has been set forth merely to illustrate the invention and is not intended to be limiting. Since modifications of the disclosed embodiment incorporating the spirit and substance of the invention may occur to persons skilled in the art, the invention should be construed to include everything within the scope of the appended claims and equivalents thereof.

What is claimed is:

1. A pedal arrangement for a motor vehicle comprising:
   at least one pedal,
   a bearing block on which the at least one pedal is disposed so as to swivel about a swivelling axis,
   a vehicle body element, to which the bearing block for the at least one pedal is fixed, arranged in an area of a vehicle interior, a lever extension on the at least one pedal which projects beyond the swivelling axis to an opposite side from the pedal, a dimensionally stable transmitting rod, which extends in a longitudinal direction of the vehicle, linked at one end in a force-transmitting manner to said lever extension and in an operative connection with a vehicle operating unit, a lever arm of a double-armed lever rocker, which is swivellably disposed on a front wall, linked to another end of said dimensionally stable transmitting rod, and an opposite lever arm of the lever rocker linked to a plunger rod of the vehicle operating unit which extends in the longitudinal direction of the vehicle and, alone with the transmitting rod, in the direction of the front wall.

2. The pedal arrangement according to claim 1, wherein the vehicle body element is formed by a transverse support which extends in an area of a center console.

3. The pedal arrangement according to claim 1, and further comprising a second bearing block on the front wall, wherein the lever rocker is swivellably disposed on the second bearing block on the front wall, and the second bearing block and the plunger rod are dimensioned such that at least the opposite lever arm of the lever rocker linked to the plunger rod extends in a vertical direction of the vehicle.

4. The pedal arrangement according to claim 3, wherein the second bearing block and the plunger rod are designed such that, in a frontal impact load, the second bearing block and the plunger rod act like rigid components.

5. A pedal arrangement comprising:

a pedal including a lever extension and pivotable around a first swivelling axis;

a lever rocker pivotable around a centrally located second swivelling axis oriented parallel to said first swivelling axis, the lever rocker being interconnected at a first end with the lever extension and at a second end to a vehicle operating unit, displacement of said second swivelling axis rearward towards said first swivelling axis during a vehicle collision pivoting said pedal and said lever extension about said first swivelling axis to move the pedal away from the driver, and a transmitting rod interconnecting the first end of the lever rocker with the lever extension.

6. The pedal arrangement according to claim 5, wherein said lever rocker includes an upper arm defining said first end and a lower arm having the same length as said upper arm and defining said second end.

7. A pedal arrangement comprising:

a pedal including a lever extension and pivotable around a first swivelling axis;

a lever rocker pivotable around a centrally located second swivelling axis oriented parallel to said first swivelling axis, the lever rocker being interconnected at a first end with the lever extension and at a second end to a vehicle operating unit, displacement of said second swivelling axis rearward towards said first swivelling axis during a vehicle collision pivoting said pedal and said lever extension about said first swivelling axis to move the pedal away from the driver, a first bearing block secured to a transverse support and providing for said first swivelling axis, and a stop defined on said first bearing block to limit swivelling of said lever extension.

8. A pedal arrangement comprising:

a pedal including a lever extension and pivotable around a first swivelling axis;

a lever rocker pivotable around a centrally located second swivelling axis oriented parallel to said first swivelling axis, the lever rocker being interconnected at a first end with the lever extension and at a second end to a vehicle operating unit, displacement of said second swivelling axis rearward towards said first swivelling axis during a vehicle collision pivoting said pedal and said lever extension about said first swivelling axis to move the pedal away from the driver, wherein said pedal is a brake pedal and said vehicle operating unit is a brake operating unit, and a transmitting rod interconnecting the first end of the lever rocker with the lever extension.

9. A pedal arrangement comprising:

a pedal including a lever extension and pivotable around a first swivelling axis;

a lever rocker pivotable around a centrally located second swivelling axis oriented parallel to said first swivelling axis, the lever rocker being interconnected at a first end with the lever extension and at a second end to a vehicle operating unit, displacement of said second swivelling axis rearward towards said first swivelling axis during a vehicle collision pivoting said pedal and said lever extension about said first swivelling axis to move the pedal away from the driver, said pedal being a brake pedal and said vehicle operating unit being a brake operating unit, a first bearing block secured to a transverse support and providing for said first swivelling axis, and a stop defined on said first bearing block to limit swivelling of said lever extension.

10. A pedal arrangement comprising:

a pedal including a lever extension and pivotable around a first swivelling axis;

a lever rocker pivotable around a centrally located second swivelling axis oriented parallel to said first swivelling axis, the lever rocker being interconnected at a first end with the lever extension and at a second end to a vehicle operating unit, displacement of said second swivelling axis rearward towards said first swivelling axis during a vehicle collision pivoting said pedal and said lever extension about said first swivelling axis to move the pedal away from the driver, a first bearing block secured to a transverse support and providing for said first swivelling axis, and a transmitting rod interconnecting the first end of the lever rocker with the lever extension.

* * * * *